United States Patent
Krawczak

[19]

[11] Patent Number: 6,074,125
[45] Date of Patent: Jun. 13, 2000

[54] TIE ROD ASSEMBLE FOR A MOTOR VEHICLE AND RELATED METHOD

[75] Inventor: Lawrence E. Krawczak, Sterling Heights, Mich.

[73] Assignee: Chrysler Corporation, Auburn Hills, Mich.

[21] Appl. No.: 09/105,292

[22] Filed: Jun. 26, 1998

[51] Int. Cl.$^7$ ....................................................... F16D 1/00
[52] U.S. Cl. .................... 403/374.3; 403/374.3; 403/344; 403/109.4; 280/93.51
[58] Field of Search ................. 403/320, 374.3, 403/374.2, 374.1, 373, 377, 378, 109.4, 110, 344, 310, 312; 280/93.502, 93.51

[56] References Cited

U.S. PATENT DOCUMENTS

| | | | |
|---|---|---|---|
| 1,537,330 | 5/1925 | Buckendale | 280/93.51 X |
| 4,761,019 | 8/1988 | Dubensky | 280/674 |
| 5,059,053 | 10/1991 | Rose | 280/93.51 X |
| 5,104,136 | 4/1992 | Buhl et al. | 280/93.51 X |
| 5,306,095 | 4/1994 | Snitgen et al. | 403/344 X |
| 5,588,336 | 12/1996 | Chou | 403/344 X |
| 5,603,583 | 2/1997 | Jackson | 403/320 |

*Primary Examiner*—Terry Lee Melius
*Assistant Examiner*—John R. Cottingham
*Attorney, Agent, or Firm*—James R. Yee

[57] ABSTRACT

A tie rod assembly for a motor vehicle includes an inner tie rod member, an outer tie rod member and an intermediate member. The intermediate member is telescopically associated with both of the inner and outer tie rod members. A generally C-shaped clamp is adapted to arrest relative movement between the inner and outer tie rod members. The clamp includes first and second ends which are spaced apart so as to define a gap. The outer tie rod member includes a longitudinally extending slot. The clamp is fixedly attached to the inner tie rod member such that the gap between the first and second ends of the clamp is aligned with the longitudinally extending slot of the inner tie rod member. As a result, clamping forces are more effectively transferred from the inner tie rod member to the intermediate member, and in turn from the intermediate member to the outer tie rod member.

3 Claims, 2 Drawing Sheets

TIE ROD ASSEMBLE FOR A MOTOR VEHICLE AND RELATED METHOD

BACKGROUND OF THE INVENTION

1. Technical Field

The present invention generally pertains to motor vehicles. More particular, the present invention pertains to a tie rod assembly for a motor vehicle and a related method. More specifically, but without restriction to the particular embodiment and/or use which is shown and described for purposes of illustration, the present invention relates to a method and apparatus for adjustably interconnecting a motor vehicle wheel to an associated steering arrangement.

2. Discussion

The steering linkages associated with both front wheels of modern motor vehicles include tie rod assemblies having an outer tie rod member attached to a steering knuckle, an inner tie rod member, and adjusting tubes and clamps. The inner tie rod members are connected by an intermediate arm. The adjusting tubes and clamps control the toe-in setting, which refers to a condition in which the front parts of the front wheels are closer together than the rear parts. Accurate toe-in setting is important to ensure proper handling and normal tire wear.

In one known arrangement previously employed by the Assignee of the present application, inner and outer tie rod members are interconnected by an intermediate member. The inner tie rod member, outer tie rod member and the intermediate tie rod member effectively define a turn buckle arrangement for adjusting the inner tie rod member relative to the outer tie rod member through rotation of the intermediate member. An external clamping force is applied directly to the inner tie rod member for arresting rotation of the inner tie rod member relative to the intermediate member, and in turn arresting relative rotation of the intermediate member to the outer tie rod member.

While various types of tie rod assemblies have heretofore been employed for adjusting the toe-in setting, they are all associated with disadvantages. Many of these tie rod assemblies are difficult to clamp so as to attain a fixed relationship between inner and outer tie rod members. As a result, an undue amount of input torque is required for proper use. If sufficient torque is not employed, mis-alignment may develop.

SUMMARY OF THE INVENTION

It is a general object of the present invention to provide an improved tie rod assembly for a motor vehicle and a related method which overcome the disadvantages associated with known tie rod assemblies, including but not limited to those discussed above.

It is a more specific object of the present invention to provide a tie rod assembly with a clamping mechanism for selectively arresting the relative positions of inner and outer tie rod members with a reduced amount of input torque for a motor vehicle.

In one form, the present invention provides a tie rod assembly for a motor vehicle which includes an inner tie rod member, an outer tie rod member and an intermediate member. The intermediate member is telescopically interconnected to the inner tie rod member and also telescopically interconnected to the outer tie rod member. The inner tie rod member includes a longitudinally extending slot. The tie rod assembly further includes a generally C-shaped clamp having first and second spaced apart ends. The first and second spaced apart ends define a gap. The clamp is fixedly attached to the intermediate member such that the gap aligns with the longitudinally extending slot.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
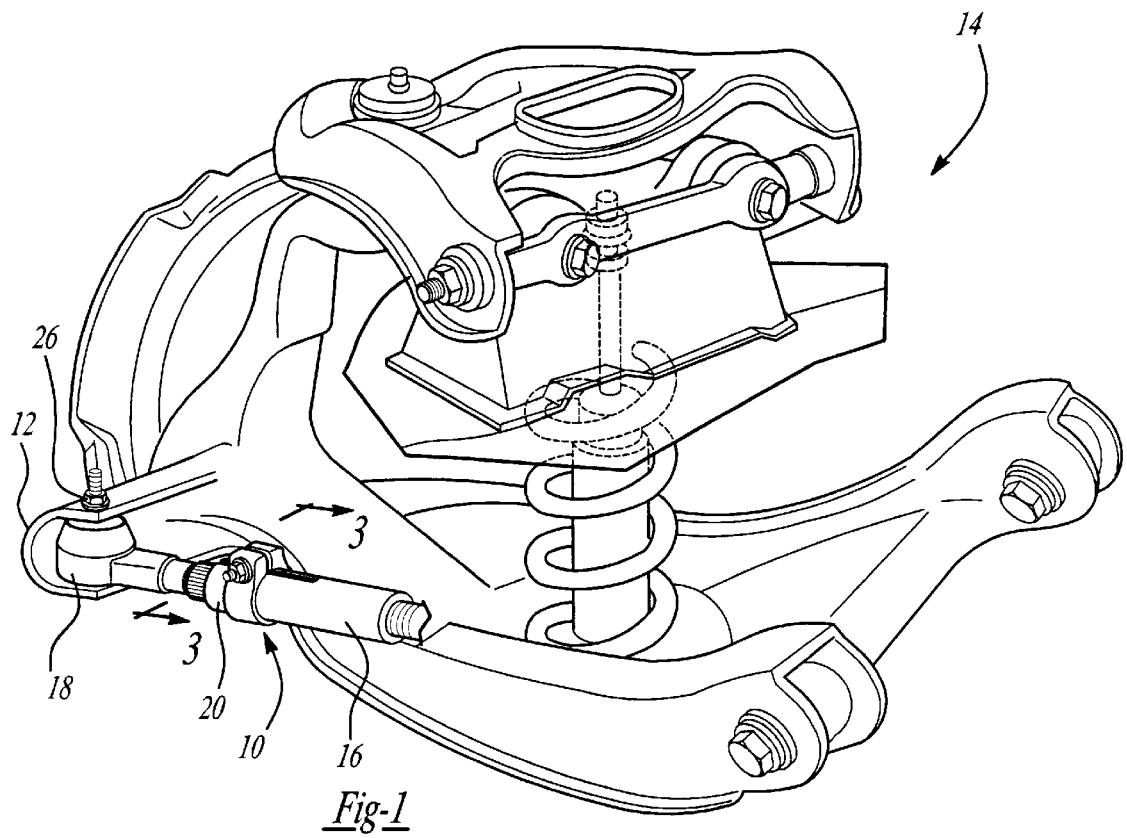
FIG. 1 is a perspective view of a portion of a motor vehicle suspension incorporating a tie rod assembly constructed in accordance with the teachings of a preferred embodiment of the present invention.

Referring initially to FIG. 1, a tie rod assembly constructed in accordance with the teachings of a preferred embodiment of the present invention is illustrated and generally identified with reference numeral 10. The tie rod assembly 10 is shown operatively attached to a steering knuckle 12 of a motor vehicle suspension 14. It will be understood that the particular steering knuckle 12 illustrated is merely exemplary. One suitable steering knuckle 12 is shown and described in U.S. Pat. No. 4,761,019, which is hereby incorporated by reference as if fully set forth herein.

Figure 3:
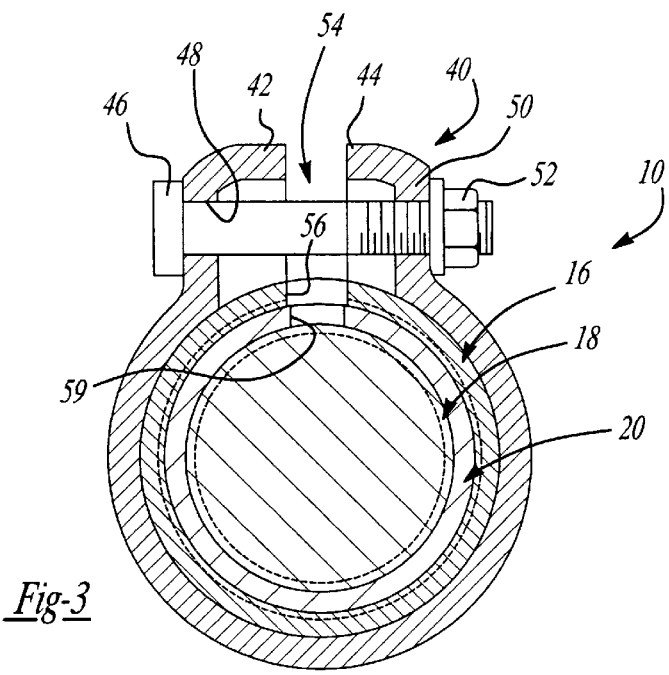
FIG. 3 is a cross-sectional view taken along the line 3—3 of FIG. 1.
Figure 2:
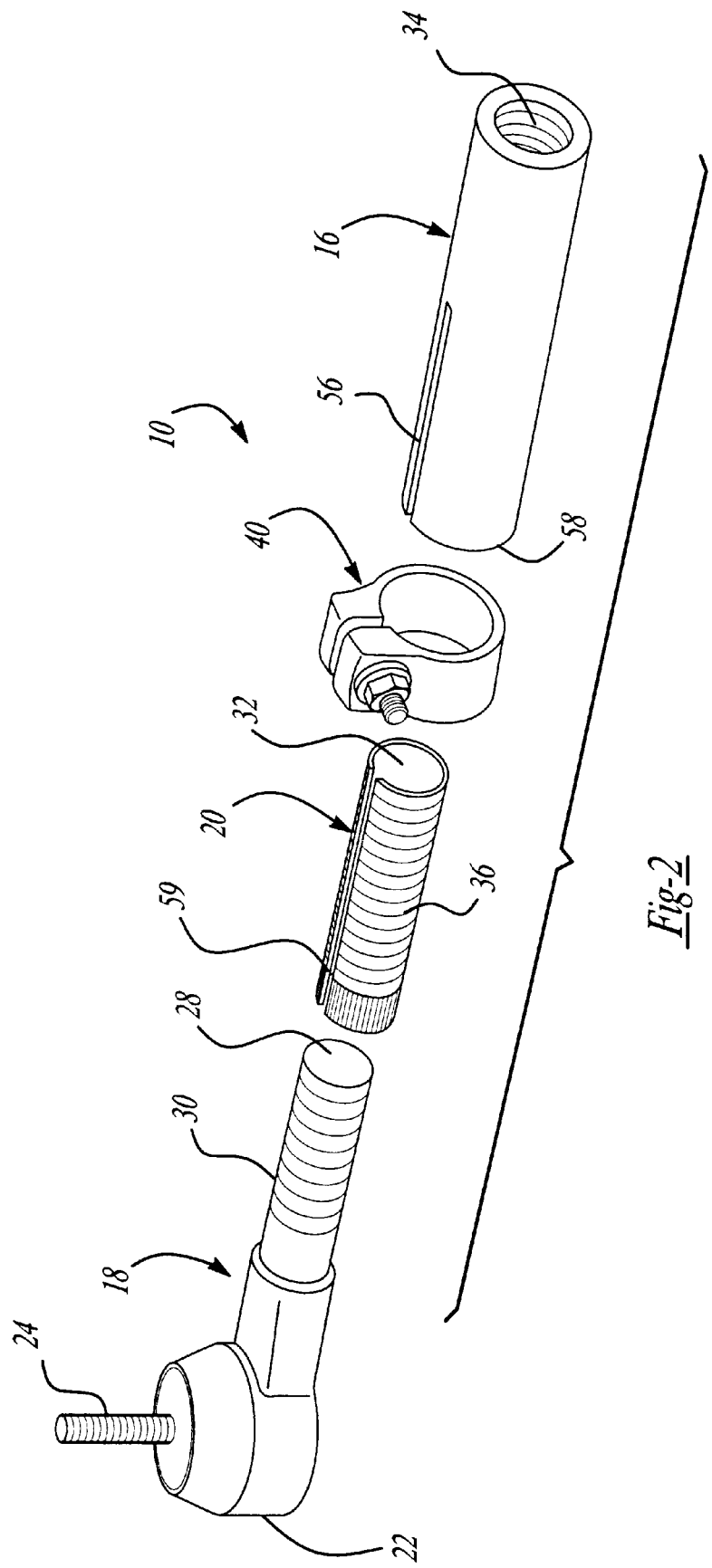
FIG. 2 is a partially exploded view of the tie rod assembly of FIG. 1.

With continued reference to the environmental view of FIG. 1 and additional reference to FIGS. 2 and 3, the tie rod assembly 10 is shown to generally include an inner tie rod member 16, an outer tie rod member 18 and an intermediate member 20. The outer tie rod member 18 is conventionally adapted to attach to the steering knuckle 12. In this regard, the outer tie rod member 18 includes a first end 22 having a threaded rod 24 which extends generally perpendicular to a longitudinal axis of the tie rod assembly 10, through an aperture (not specifically shown) provided in the steering knuckle 12 and is retained with a nut 26 conventionally attached to the steering knuckle 12. A second end 28 of the outer tie rod member 18 is telescopically received by the intermediate member 20, which in turn is telescopically received by the inner tie rod member 16. In the embodiment illustrated, the second end of the outer tie rod member 18 is cylindrical and formed to include external threads 30.

The intermediate member 20 is illustrated to preferably comprise a generally cylindrical sleeve. The intermediate member 20 is formed to include internal threads 32. The internal threads 32 of the intermediate member 20 are adapted to meshingly engaged with external threads 30 of the outer tie rod member 18.

The inner tie rod member 16 is similarly generally cylindrical in shape and includes internal threads 34. The internal threads 34 of the inner tie rod member 16 meshingly engage external threads 36 provided on the intermediate member 20. In the embodiment illustrated, the internal threads 34 of the inner tie rod member 16 and the external threads 36 of the intermediate member 20 have a left hand pitch. As a result, the inner and outer tie rod members 16 and 18 and the intermediate member 20 effectively provide a turnbuckle arrangement. That is, rotation of the intermediate member 20 in a first direction draws the inner and outer tie rod members 16 and 18 together. Conversely, rotation of the intermediate member 20 in a second, opposite direction forces the inner and outer tie rod members 16 and 18 apart. Hence, inward and outward adjustment of the steering knuckle 12 is selectively controlled through rotation of the intermediate member 20.

The tie rod assembly 10 of the present invention is further shown to include a clamp 40 for releasably securing the relative positions of the inner tie rod member 16, the outer tie rod member 18, and the intermediate member 20. The clamp 40 is preferably shown to have a C-shape with first and second generally parallel and spaced apart ends 42 and 44. The clamp 40 circumferentially surrounds the inner tie rod member 16. In the preferred embodiment, the clamp 40 is fixedly staked or otherwise similarly attached to the inner tie rod member 16. A bolt 46 passes through cooperating apertures 48 and 50 in the first and second ends 42 and 44, respectively, and is retained by a nut 52. Upon tightening of the nut 52, the first and second ends 42 and 44 of the clamp 40 are brought together, thereby reducing a gap 54 therebetween. Tightening of the nut 52 also imparts a clamping force on the inner tie rod member 16, thereby effectively reducing its diameter.

In the preferred embodiment illustrated, the inner tie rod member 16 is formed to include a longitudinally extending slot 56. As shown, the longitudinally extending slot 56 is open adjacent an outer end 58 of the inner tie rod member 16 and extends for approximately one half the length of the inner tie rod member 16. The clamp 40 is preferably oriented so that the gap 54 between the first and second ends of the clamp 42 and 44 aligns with the longitudinally extending slot 56 in the inner tie rod member 16.

To facilitate the transfer of the clamping force from the inner tie rod member 16 to the outer tie member 18, the intermediate member 20 is also shown to include a longitudinally extending slot 59. In the exemplary embodiment illustrated, the slot 59 of the intermediate member 20 extends its entire length. Thus, when the ends 42 and 44 of the clamp 40 are drawn together to thereby compress the inner tie rod member 16, the inner tie rod member in turn compresses the intermediate member 20. This compression of the intermediate member 20 arrests relative rotation between the intermediate member 20 and the outer tie rod member 18. While slot 59 of intermediate member 20 is shown in the drawings as aligned with slot 56 of inner tie rod member 16 and with gap 54 of clamp 40, it should be understood that slot 59 need not be so aligned, and in use its orientation with respect to slot 56 and gap 54 can be random.

Alignment of the gap 54 between the first and second ends 42 and 44 of the clamp 40 and the longitudinally extending slot 56 of the inner tie rod member 16 optimizes clamping of the inner tie rod member 16. In addition, clamping forces are more effectively transferred from the intermediate member 20 to the outer tie rod member 18. In one application, the average torque required to rotate the outer tie rod member 18 relative to the inner tie rod member 16 at 28 ft/lbs. of fastener torque was 78 ft/lbs. −3 sigma 47 ft/lbs.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. In a suspension system for a motor vehicle including a steering knuckle, a tie rod assembly attached to the steering knuckle, the tie rod assembling including an inner tie rod member including a first longitudinally extending slot, an outer tie rod member, an intermediate member having a second longitudinally extending slot, the intermediate member telescopically interconnected to the inner tie rod member and telescopically interconnected to the outer tie rod member, and a generally C-shaped clamp having first and second ends spaced apart so as to define a gap, the improvement comprising the clamp being fixedly attached to the inner member such that the gap aligns with the first and second longitudinally extending slots, the C-shaped clamp circumferentially surrounding each of the inner tie rod member, the outer tie rod member and the intermediate member.

2. In a tie rod assembly for a motor vehicle including an inner tie rod member having a first longitudinally extending slot, an outer tie rod member, an intermediate member, having a second longitudinally extending slot, telescopically interconnected to the inner tie rod member and telescopically interconnected to the outer tie rod member, and a generally C-shaped clamp having first and second ends spaced apart so as to define a gap, the improvement comprising the clamp being fixedly attached to the inner member such that the gap aligns with the first and second longitudinally extending slots, the C-shaped clamp circumferentially surrounding each of the inner tie rod member, the outer tie rod member and the intermediate member.

3. In a method of adjustably securing an inner tie rod member having a first longitudinally extending slot to an outer tie rod member having the steps of:

providing an intermediate member having a second longitudinally extending slot;

telescopically interconnecting the intermediate member and the inner tie rod member;

telescopically interconnecting the intermediate member and the outer tie rod member;

providing a generally C-shaped clamp having first and second ends spaced apart to define a gap;

circumferentially surrounding each of the inner tie rod member, the outer tie rod member and the intermediate member with the clamp;

fixedly attaching the generally C-shaped clamp to the inner tie rod member;

tightening the clamp; and aligning the gap with the first and second longitudinally extending slots of the inner tie rod member and intermediate member, respectively.

* * * * *